(12) United States Patent
Francisquini

(10) Patent No.: US 11,050,232 B2
(45) Date of Patent: Jun. 29, 2021

(54) STRUCTURAL ARRANGEMENT FOR USE IN A CONDUCTING BUSBAR

(71) Applicant: Melquisedec Francisquini, São Paulo II Cotia (BR)

(72) Inventor: Melquisedec Francisquini, São Paulo II Cotia (BR)

( * ) Notice: Subject to any disclaimer, the term of this patent is extended or adjusted under 35 U.S.C. 154(b) by 0 days.

(21) Appl. No.: 16/646,171

(22) PCT Filed: Sep. 11, 2018

(86) PCT No.: PCT/BR2018/050334
§ 371 (c)(1),
(2) Date: Mar. 11, 2020

(87) PCT Pub. No.: WO2019/046924
PCT Pub. Date: Mar. 14, 2019

(65) Prior Publication Data
US 2020/0280180 A1    Sep. 3, 2020

(30) Foreign Application Priority Data

Sep. 11, 2017 (BR) .................. BR 2017 019382-9
Sep. 6, 2018 (BR) .................. BR 2018 068113-3

(51) Int. Cl.
*H02G 5/06* (2006.01)
*H01B 5/06* (2006.01)
*H01B 5/02* (2006.01)

(52) U.S. Cl.
CPC ............... *H02G 5/06* (2013.01); *H01B 5/06* (2013.01); *H01B 5/02* (2013.01)

(58) Field of Classification Search
CPC ............... H02G 5/06; H01B 5/02; H01B 5/06
See application file for complete search history.

(56) References Cited

U.S. PATENT DOCUMENTS

| | | | | |
|---|---|---|---|---|
| 5,785,542 A * | 7/1998 | Johnson | | H01R 25/162 439/210 |
| 6,296,498 B1 * | 10/2001 | Ross | | H01R 25/145 439/115 |
| 2003/0106785 A1 * | 6/2003 | Bach | | H01H 71/08 200/51.1 |
| 2005/0174020 A1 * | 8/2005 | Francisquini | | H02B 1/308 312/265.3 |
| 2007/0175648 A1 * | 8/2007 | Francisquini | | H02B 1/01 174/50 |
| 2011/0140446 A1 * | 6/2011 | Knoop | | F03D 80/85 290/55 |
| 2012/0314340 A1 * | 12/2012 | Faber | | H01R 13/04 361/611 |
| 2014/0174782 A1 * | 6/2014 | Ross | | H01B 13/34 174/68.2 |
| 2014/0342585 A1 * | 11/2014 | Benedetti | | H02G 5/02 439/110 |

* cited by examiner

*Primary Examiner* — Timothy J Thompson
*Assistant Examiner* — Rhadames Alonzo Miller

(57) ABSTRACT

A busbar and constructive variations thereof, which has a closed tubular format, based on single, double and triple walls, and said busbar can be manufactured by extrusion, profiling or bending process.

11 Claims, 9 Drawing Sheets

FIG. 1.1
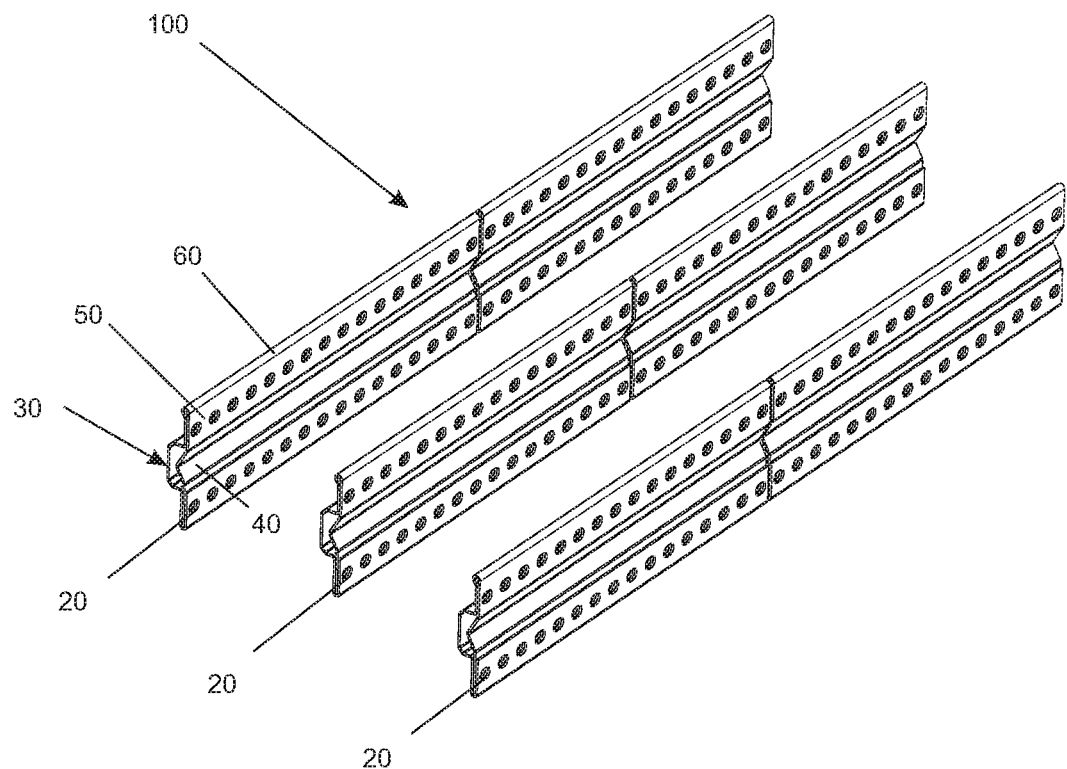
FIG. 1.2
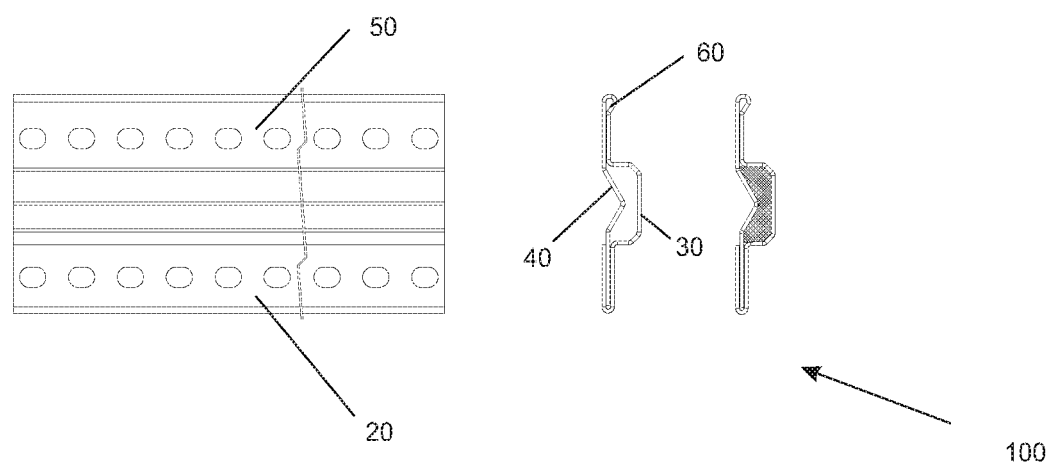

FIG. 1.3
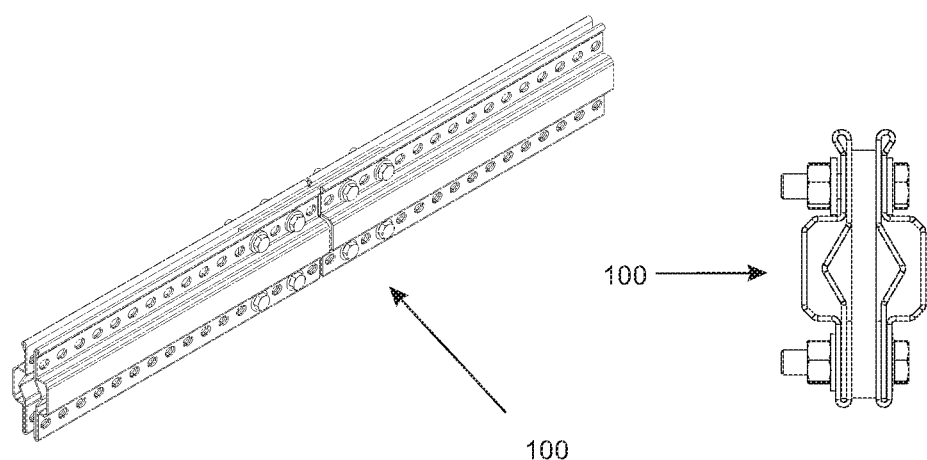
FIG. 2.1
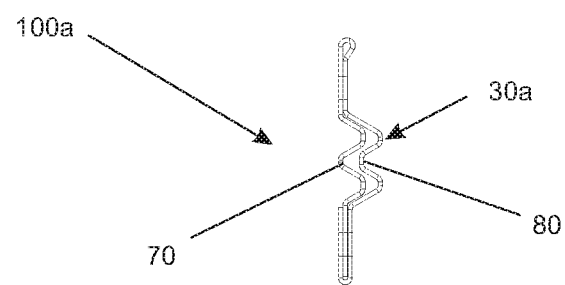

FIG. 3.1
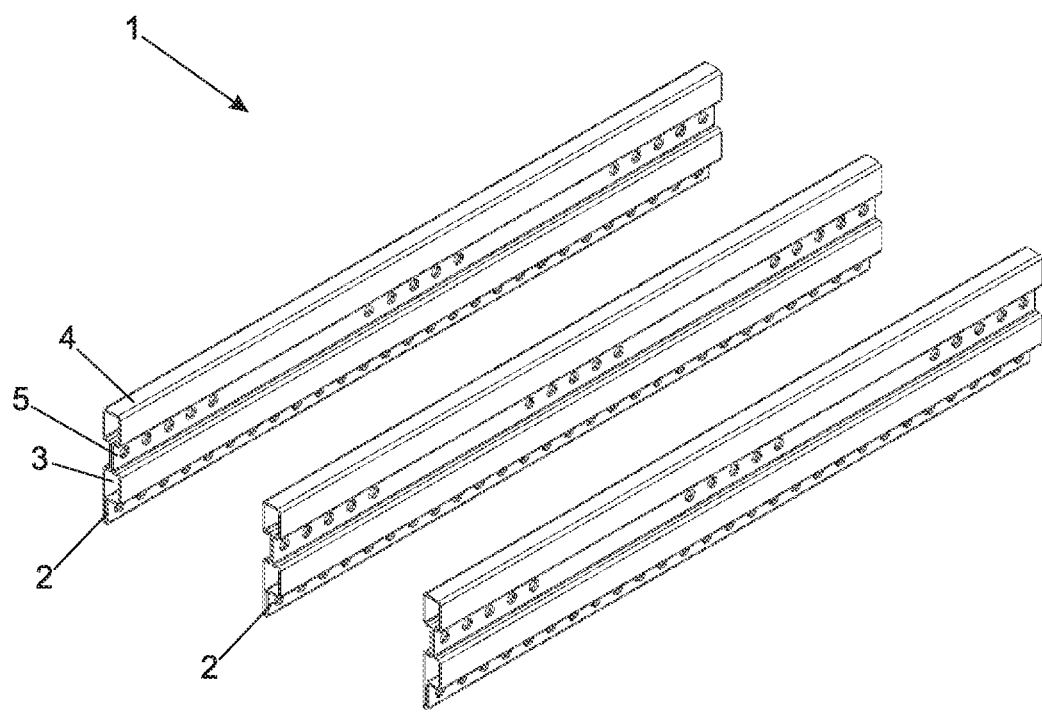
FIG. 3.2
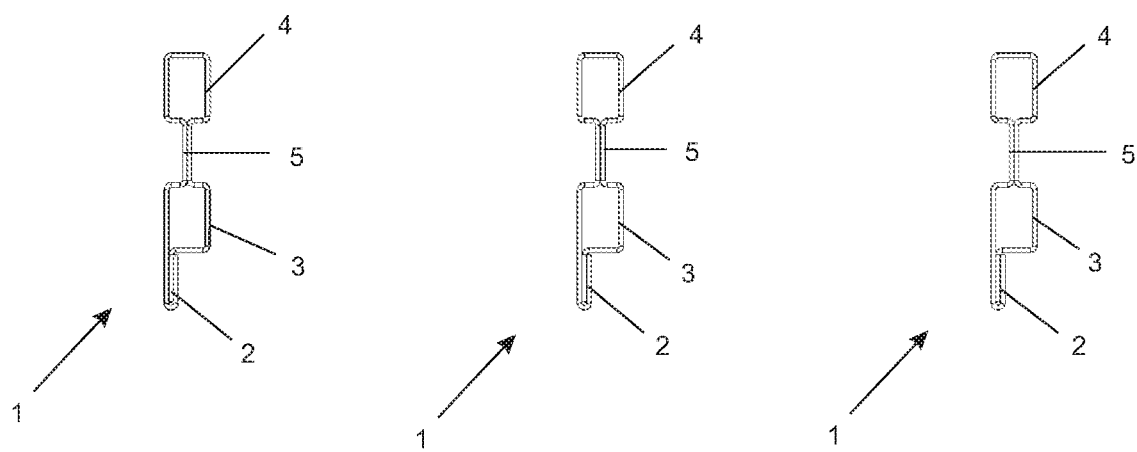

FIG. 3.3
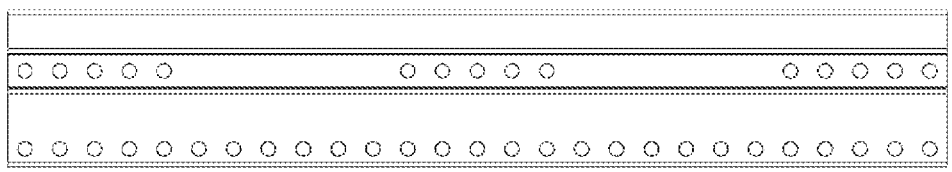
FIG. 3.4
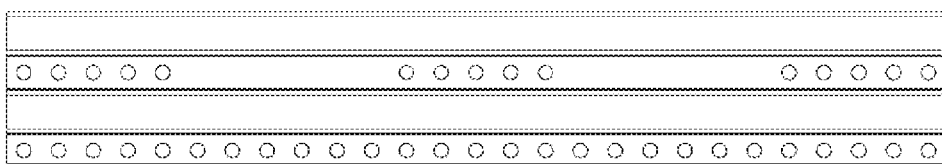
FIG. 4.1
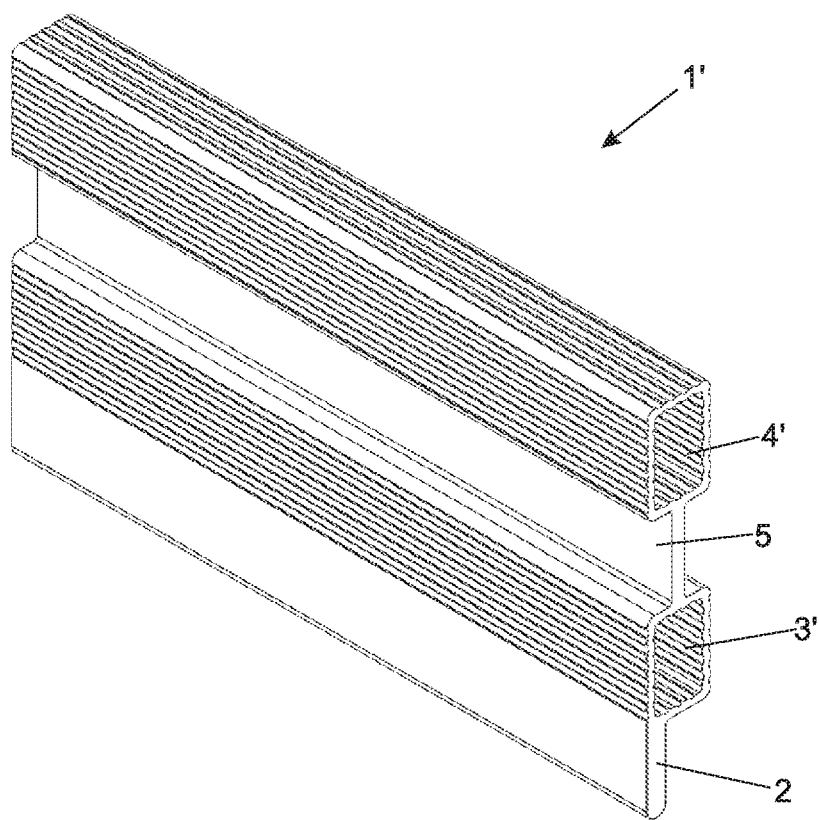

FIG. 4.2
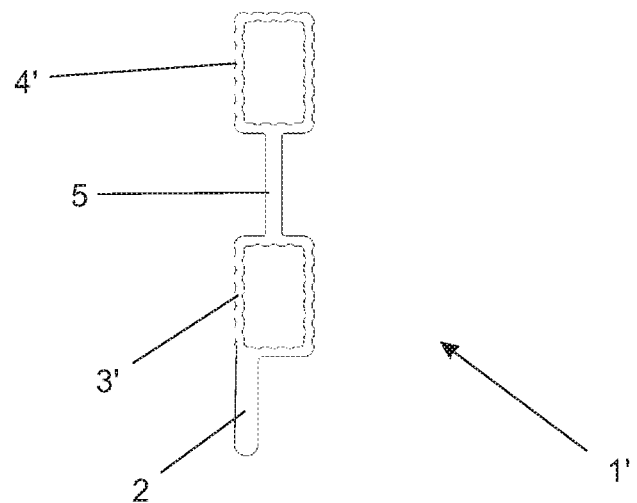
FIG. 5.1
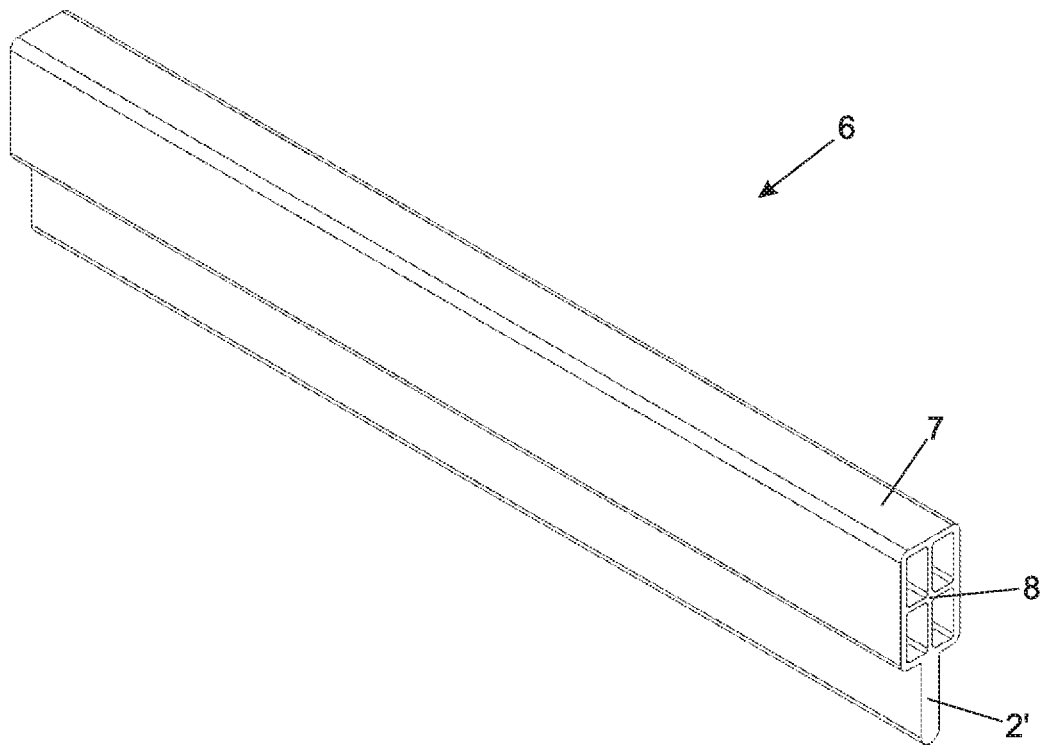

FIG. 5.2
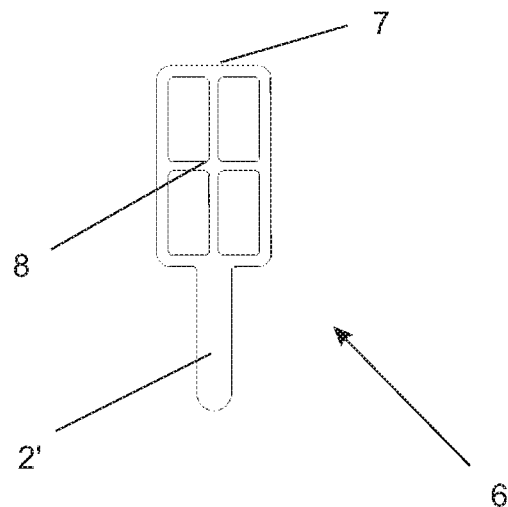
FIG. 6.1
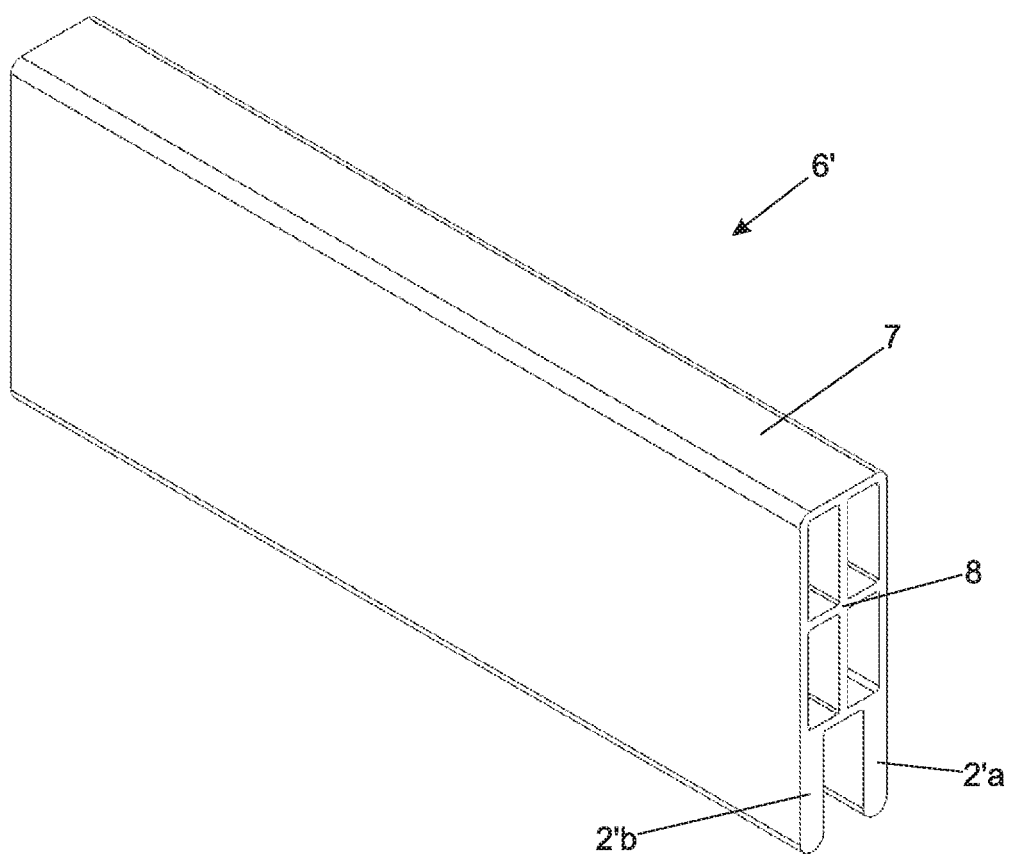

FIG. 6.2
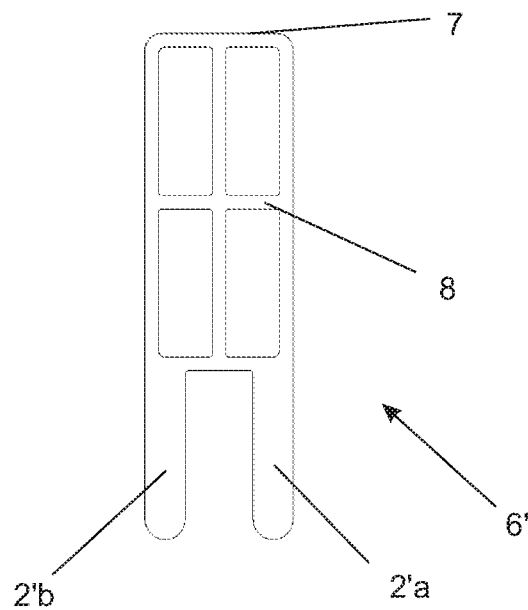
FIG. 7.1
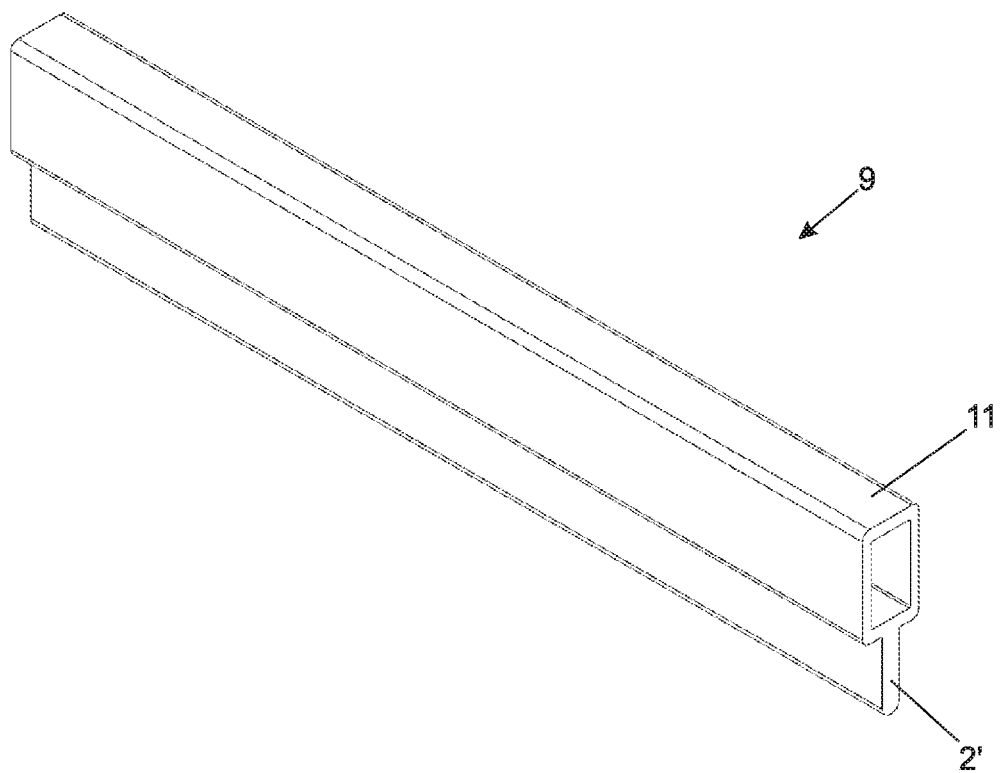

FIG. 7.2
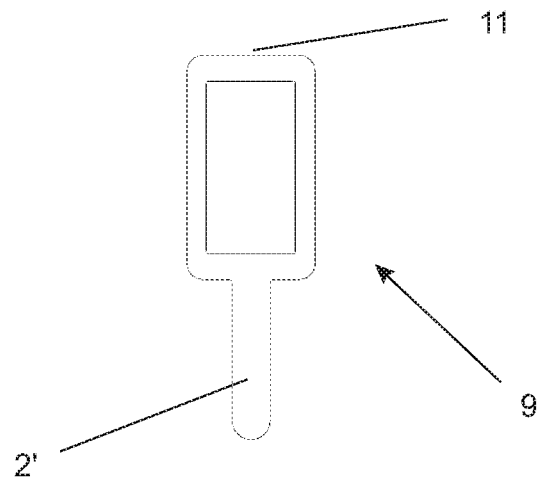
FIG. 8.1
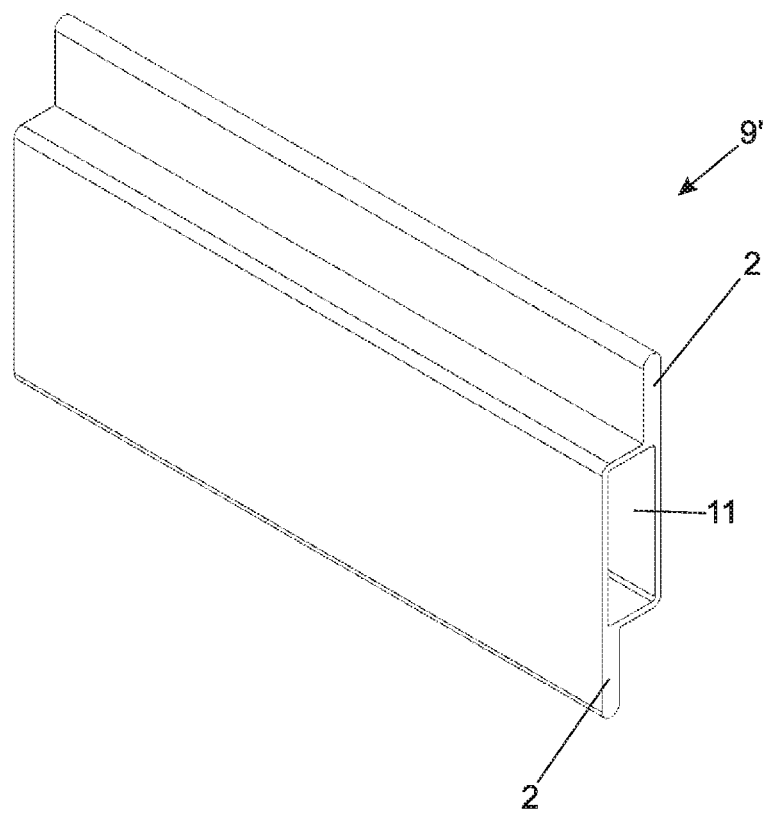

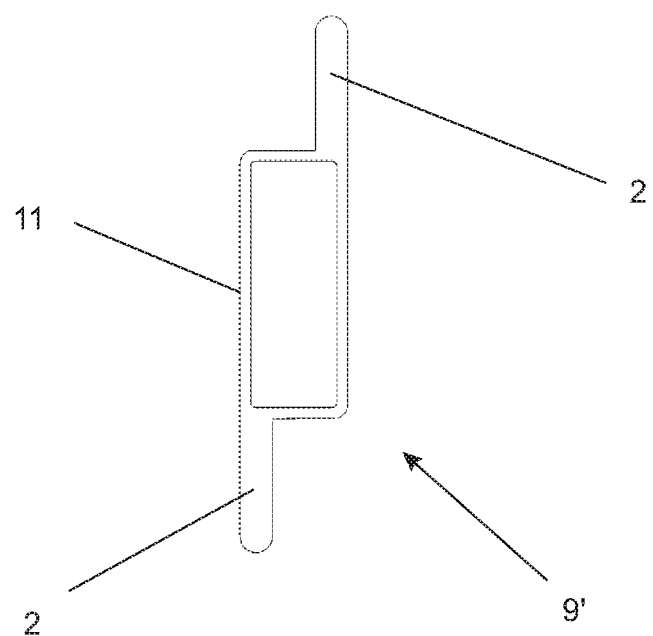
FIG. 8.2

STRUCTURAL ARRANGEMENT FOR USE IN A CONDUCTING BUSBAR

This application is a National Phase of PCT Patent Application No. PCT/BR2018/050334 having International filing date of Sep. 11, 2018, which claims the benefit of priority of Brazilian Patent Application Nos. BR 10 2017 019382-9 filed on Sep. 11, 2017 and BR 10 2018 068113-3 filed on Sep. 6, 2018. The contents of the above applications are all incorporated by reference as if fully set forth herein in their entirety.

FIELD AND BACKGROUND OF THE APPLICATION

The present invention refers to a busbar applied to electric cabinets, built in closed tubular profile, in a configuration that presents electrical and mechanical resistance compatible with solid busbars, but with savings on material for the construction thereof.

Electric cabinets are important electrical devices, very widely used in industry in general.

Their basic function is to power and/or control equipment, devices, work areas or cells, at industrial plants, being adaptable to almost all fields of industrial, of automation and/or services.

Electric cabinets are normally divided into compartments or drawers, which have a diversity of assembled components, having various purposes.

In the vast majority of applications, the electric cabinets are connected to the primary electric energy network by way of busbars, which are made of copper or other conductive material, which conduct electricity between the primary network and the electric cabinets, which will power the equipment connected thereto.

Due to the high electrical current applied in these busbars, they need electric and mechanical characteristics compatible with said currents, also being subjected to a series of tests which are designed to guarantee a mechanical resistance to dynamic strain caused by short circuiting and other requirements.

Given these intrinsic characteristics of the electric busbars, they are almost all made of copper, since it presents low resistivity, providing good electric conductivity, having a relatively low manufacturing cost compared to other conductive materials such as silver and gold.

The manufacturing process of said busbars made of copper is by means of extrusion, basically consisting of the introduction of copper billets, bars having length and width different to the desired product, in hydraulic presses, which are responsible for developing the passage of said billets into openings with pre-defined geometric forms, known as matrix, thus forming the desired profile.

In turn, the matrixes are developed so as to provide various types of profiles, such as squared, rectangular, triangular, circular, and others, being employed in all modalities of extrusion.

Since busbars are subjected to high values of alternating current, they have a high incidence of the skin effect, that is, the useful electricity conduction area is decreased, since the alternating current tends to concentrate in the outer portions of the conductor in detriment to its central portion.

As a consequence of the skin effect, more material is used to produce solid busbars, whereby increasing its cross-sectional area in order to guarantee a low electrical resistance conductor, resulting in a more efficient busbar.

In almost all applications of copper busbars in electric cabinets, the configuration found for subjecting themselves to the mechanical and electric requirements use solid rectangular bars varying in size, such as 100×10 mm, 80×10 mm, 50×10 mm and others.

Accordingly, to achieve the electric conductivity required for certain applications, jointly with the mechanical resistance to short circuiting required by current technical norms, the copper busbars produced by extrusion having a high robustness, stemming from the use of a greater amount of copper, given the limitations presented.

SUMMARY OF THE INVENTION

The objective of the present invention is to present a constructive arrangement applied to a high current busbar, applicable in low and medium voltage electric cabinets, which can be obtained by various manufacturing means, such as extrusion, profiling or bending.

Said constructive arrangement stands out in that it provides optimal electric conductivity and mechanical resistance while using a smaller amount of material, whereby saving on natural resources.

One of the main characteristics of the present invention is its ease of assembly, as it presents a triple wall endowed with various orifices that enable better connection between the busbar and the branch circuit connections, as well as a central double wall, also endowed with orifices that provide superior connection between the busbar and the seam connections.

Another objective of the present invention lies in its diversity of applications, since besides its main configuration, it has a series of constructive variations, thus being adaptable to the most varied of applications in electric cabinets, such as primary power, secondary power and others.

BRIEF DESCRIPTION OF THE SEVERAL VIEWS OF THE DRAWINGS

For a full understanding and visualization of the invention presented in the detailed description, but not intended to limit or restrict the scope of this invention, the following drawings are presented, wherein:

FIG. 1.1 presents a perspective view of the busbar in its main constructivity;

FIG. 1.2 presents a front view of the busbar in its main constructivity;

FIG. 1.3 presents a perspective view and a front view of the busbar in its main constructivity;

FIG. 2.1 presents a front view of a constructive variation of the busbar;

FIG. 3.1 presents a perspective view of the main constructive variation;

FIG. 3.2 presents a front view of the main constructive variation;

FIG. 3.3 presents a right-side view of the main constructive variation;

FIG. 3.4 presents a left-side view of the busbar in its main constructivity;

FIG. 4.1 presents a perspective view of the constructive variation beam busbar;

FIG. 4.2 presents a front view of the constructive variation beam busbar;

FIG. 5.1 presents a perspective view of the constructive variation single busbar with central flange and internal reinforcement.

FIG. 5.2 presents a front view of the constructive variation single busbar with central flange and internal reinforcement;

FIG. 6.1 presents a perspective view of the dual fitting constructive variation;

FIG. 6.2 presents a front view of the dual fitting constructive variation;

FIG. 7.1 presents a perspective view of the constructive variation single busbar with central flange;

FIG. 7.2 presents a front view of the constructive variation single busbar with central flange;

FIG. 8.1 presents a perspective view of the constructive variation single busbar with two side flanges; and FIG. 8.2 presents a front view of the constructive variation single busbar with two side flanges.

DESCRIPTION OF SPECIFIC EMBODIMENTS OF THE INVENTION

In accordance with the objectives presented in the brief description, the present patent application presents a busbar (100) which can be obtained by both profiling process and by extrusion process or even by way of bending machine, which has a unique configuration, connecting the savings on materials in the production and efficiency in the application thereof, as it provides optimal electric conductivity and mechanical resistance.

The busbar (100) has a format based on L-shaped beams, which are recognizably resistant to the strain and loads applied, whereby favoring the mechanical resistance of the busbar (100), thus enabling it to be approved in various short circuit tests to which said busbars are subjected, only undergoing elastic deformation under currents of up to 80 kA 1 s.

The busbar (100) presents a triple wall (20) in its lower portion, which has central holes equidistant to each other on its entire extent, that is, length. Just above the triple wall (20) is a central structure (30), in tubular format, substantially cubic, containing a real wall (40) in V-shape, where the vertex extends inwardly of the busbar (100).

Just above the central structure (30), the busbar (100) has a double wall (50) which has central holes equidistant to each other on its entire length, in addition to an upper flange (60) in its uppermost portion, where the double walls are slightly spaced apart.

The busbar (100) has in its central structure (30) a gap that can be filled with insulating material, such as polystyrene, which contributes to stabilize the magnetic field when same is under load.

The busbar (100) is built in a continuous manner, that is, it has no welding seams or externally forged interconnections, regardless of the means used in the manufacture thereof, which contributes to high mechanical resistance, as such welding seams or forged interconnections would have points subject to greater strain.

The busbar (100) in its main application, as main busbar in electric cabinets, is used jointly, that is, two busbars (100) in each connection phase, whereby contributing, both improving the efficiency in conducting the electrical current, and for greater mechanical resistance.

A triple wall (20) of the busbar (100) cooperates for greater ease of assembly of the busbar (100) in its applications, as it acts as a kind of extension of the busbar (100) and has countless holes disposed along its entire length, which are used for connections between busbars (100), or even a fastening in the electric cabinet itself wherein the busbar (100) is applied.

The drillings present in the triple wall (20) and in the double wall (50) also have the role of cooling the busbar (100), as they enable the passage of air through these holes, favoring the dissipation of heat produced by the current passage through the busbar (100).

The busbar (100) can be used jointly, that is, two busbars (100) for a same phase, such that in this type of application the busbars (100) are mirrored, that is, with their double walls (50) facing each other, and joined by connecting elements and screws.

The busbar (100) presents a constructive variation (100*a*), wherein the central structure (30*a*) has a substantially pyramidal format, containing a real wall (70) in double curvilinear format, having a central intersection joining the two curves and a front wall (80) in the same format as the real wall (70).

The busbar (100) has a main constructive variation (1), consisting of a triple wall (2) in its lower portion, which has central holes equidistant to each other along its entire extent, that is, length. Just above the triple wall (2) is a lower structure (3) in tubular format, substantially cubic hollow, where the triple wall (2) is aligned to one of the side walls of the lower structure (3).

A main constructive variation (1) presents just above the lower structure (3) an upper structure (4) having the same format as the lower structure (3), that is, substantially cubic and hollow. The upper structure (4) is interconnected to the lower structure (3) by means of a central double wall (5) disposed on its central portions, and in said central double wall (5) there are three sets of drillings, wherein each set contains five holes equidistant to each other, such that a set of holes is in the central portion of the length of the central double wall (5) and the other two on each one of the ends of the length of said central double wall (5).

The main constructive variation (1) is built in a continuous manner, that is, it does not contain welding seams or externally forged interconnections, regardless of the means used in the manufacture thereof, which contributes to high mechanical resistance, since said welding seams or forged interconnections would present points subject to greater strain.

The same characteristic of ease of assembly present in the triple wall (2) is present in the central double wall (5), as latter also has countless holes disposed on its length, such that said holes can be used both for the direct fastening of the main constructive variation (1) in the cabinets and for connection thereof in diverters or extenders.

The busbar (100) presents a constructive variation called beam busbar (1'), which presents the same constructivity of the main constructive variation (1), but with the difference that the lower structure (3) and the upper structure (4) present small subsequent beams on their walls, called inner beam structure (3') and upper beam structure (4').

The busbar (100) also presents a third constructive variation called single busbar with central flange and internal reinforcement (6), which presents a central triple wall (2') in its lower portion and a double structure (7) in a substantially hollow parallelepipedal format disposed in a cross-shaped internal central structure (8), and each one of the ends of the cross connects to an internal side of the double structure (7); where the central triple wall (2') is interconnected to the double structure (7) in its lower portion central.

The function of said single busbar with central flange and internal reinforcement (6) is to replace the joint application of the main constructive variation (1), where instead of two main constructive variations (1) it just uses a single busbar with central flange and internal reinforcement (6).

In turn, the single busbar with central flange and internal reinforcement (6) also has a dual fitting constructive variation (6') which has substantially the same format as the single busbar with central flange and internal reinforcement (6) with the difference that instead of having a central triple wall (2') it has two side triple walls (2'a and 2'b), one on each side of the double structure (7), acting as an extension of each one of the side walls thereof.

The busbar (100) also presents a constructive variation called single busbar with central flange (9) which presents a triple wall (2') and a single central structure (11) having a substantially hollow cubic format, where the triple wall (2') is found in the central portion of the lower wall of the single central structure (11).

The main purpose of the single busbar with central flange (9) is for application in electric cabinets as secondary busbar, that is, the one that distributes the electrical current between the primary busbar and the other components of the electric cabinet. However, there is no obstacle to prevent the use of the single busbar with central flange (9) in lower load cabinets as primary busbar.

Lastly, the single busbar with central flange (9) presents a dual fitting constructive variation called single busbar with side flanges (9') which has a single central structure (11) and two triple side walls (2), where each one faces each other, such that one is interconnected to a side wall of the single central structure (11) disposed downwardly and the other is interconnected to the side wall opposite the single central structure (11) but disposed upwardly.

The purpose of said single busbar with side flanges (9') is to further facilitate assembly on the electric cabinet, since it presents not one, but two double walls (2) disposed opposite each other, whereby increasing the possibilities of fastening onto the electric cabinet, as well as the possibilities of joining by diverters or extenders.

The busbar (100) and all its constructive variations stand out from other electric busbars present in the state of the art by presenting a construction having a closed tubular format, whereas the other busbars present a solid construction. Accordingly, the busbar (100) and all the constructive variations thereof provide significant savings on conductive material in the construction thereof, decreasing the economic value of production and the impact on the natural reserves of the elements used in the construction thereof, such as copper, aluminum, gold and silver.

Another advantage of the busbar (100) and constructive variations thereof lies in its high mechanical resistance, since the fact of presenting a closed tubular construction based on walls disposed in a complex manner a mechanical resistance compared to solid rectangular busbars, whereby providing minimal deformation when exposed to high level short circuiting tests.

Lastly, another advantage of the busbar (100) and constructive variations thereof is the fact that the assembly in the applications thereof are substantially easier in comparison with solid busbars, since it presents a series of options, both walls and drillings that facilitate fastening, extension and diversion operations.

It should be understood that the present description does not limit the application to the details described herein and that the invention is capable of other modalities and of being carried out or implemented in a variety of modes, within the scope of the claims. Although specific terms have been used, said terms should be interpreted in a generic and descriptive sense, not with the purpose of limitation.

The invention claimed is:

1. A constructive arrangement, applied to high-current primary or secondary busbars, used in low and medium voltage electric cabinets, wherein a busbar is obtained by extrusion, profiling or bending process, in a continuous manner, wherein the busbar presents a triple wall in its lower portion, which has central holes equidistant to each other along its entire length; above the triple wall is a central structure, in tubular format, substantially cubic, containing a real wall in V-format, where the vertex extends inwardly of the busbar; just above the central structure is a double wall, which has central holes equidistant to each other along its entire length, as well as an upper flange in its uppermost portion, where the double walls are spaced apart.

2. The constructive arrangement, according to claim 1, wherein the busbar has in its central structure a gap that can be filled with insulating material, preferably polystyrene.

3. The constructive arrangement, according to claim 1, wherein the busbar presents a constructive variation, wherein the central structure has a substantially pyramidal format, containing a real wall in double curvilinear format, having a central intersection joining the two curves and a front wall in the same format as the real wall.

4. The constructive arrangement, according to claim 1, wherein the busbar presents a main constructive variation comprising a triple wall in its lower portion; a lower structure having a tubular format, substantially cubic and hollow, above the triple wall, this triple wall being aligned to one of the side walls of the lower structure; an upper structure having the same format as the lower structure, that is, substantially cubic and hollow and a central double wall interlinking the lower structures and upper structure by its central region.

5. The constructive arrangement, according to claim 4, wherein the triple wall has central holes equidistant to each other along its entire length.

6. The constructive arrangement, according to claim 4, wherein the central double wall has three sets of drillings, wherein each set contains five holes equidistant to each other, such that a set of holes is in the central portion of the length of the central double wall and the other two on each one of the ends of the length of said central double wall.

7. The constructive arrangement, according to claim 1, wherein it has a constructive variation called a beam busbar, which presents a same construction as the main constructive variation, but with the difference that the lower structure and the upper structure present small subsequent beams on their walls, called an inner beam structure and an upper beam structure.

8. The constructive arrangement, according to claim 1, wherein it presents a constructive variation called a single busbar with a central flange and an internal reinforcement, which presents a central triple wall in its lower portion and a double structure in a substantially hollow parallelepiped format disposed in an internal cross-shaped central structure, and each one of the ends of the cross connects with an internal side of the double structure; where a central triple wall is interconnected to the double structure in its lower portion.

9. The constructive arrangement, according to claim 8, wherein it presents a dual fitting constructive variation which has substantially the same format as the single busbar with a central flange and an internal reinforcement with the difference that instead of having a central triple wall it has two side triple walls, one on each side of the double structure, acting as an extension of each one of the side walls thereof.

10. The constructive arrangement, according to claim 1, wherein it presents a constructive variation called a single busbar with a central flange which presents a single double wall and a single central structure with a substantially hollow cubic format, where a single triple wall is in the central portion of the lower wall of the single central structure.

11. The constructive arrangement, according to claim 10, wherein a single busbar with side flanges which has a single central structure and two triple side walls, where each one faces each other, such that one is interconnected to the other side wall of the single central structure disposed downwardly and the other is interconnected to the side wall opposite the single central structure but disposed upwardly.

* * * * *